Figure 1:
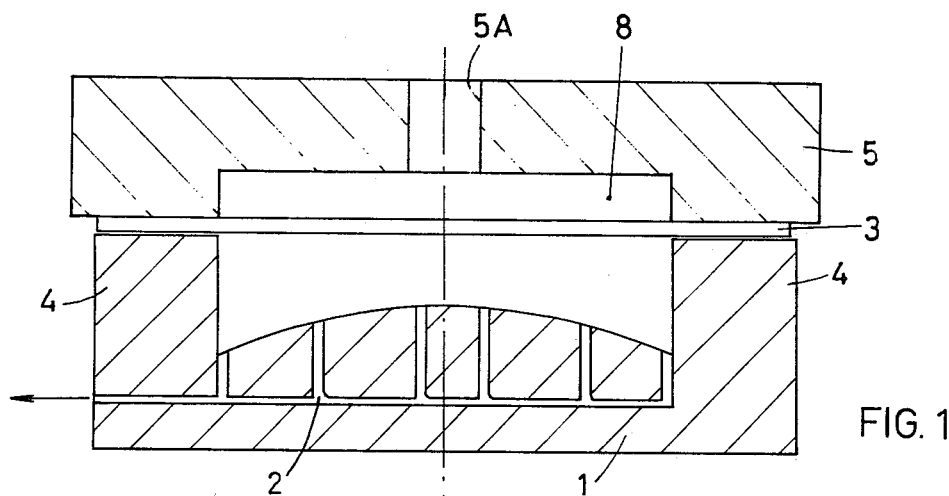

United States Patent [19]

Rennerfelt

[11] 4,364,763

[45] Dec. 21, 1982

[54] METHOD OF MAKING MIRROR BLANKS INCLUDING BLANKS MADE ACCORDING TO SAID METHOD

[76] Inventor: Gustav B. Rennerfelt, Nilstropsvagen 82, S-181 47 Lindingo, Sweden

[21] Appl. No.: 228,066
[22] PCT Filed: May 23, 1980
[86] PCT No.: PCT/SE80/00151
§ 371 Date: Jan. 26, 1981
§ 102(e) Date: Jan. 26, 1981
[87] PCT Pub. No.: WO80/02684
PCT Pub. Date: Dec. 11, 1980

[30] Foreign Application Priority Data

May 25, 1979 [SE] Sweden ................................ 7904584

[51] Int. Cl.$^3$ .................... C03C 17/02; C03B 19/06; G02B 5/08
[52] U.S. Cl. .......................................... 65/22; 65/55; 65/106; 65/107; 264/1.7; 264/45.4; 350/310
[58] Field of Search ..................... 65/22, 55, 106, 107; 350/310; 264/1.7, 34, 45.4

[56] References Cited

U.S. PATENT DOCUMENTS

| | | | |
|---|---|---|---|
| 1,653,053 | 12/1927 | Lyndon | 350/310 X |
| 2,268,251 | 12/1941 | Haux | 65/22 X |
| 3,272,686 | 9/1966 | Smith et al. | 65/22 X |
| 3,505,436 | 4/1970 | Krug et al. | 65/22 X |
| 4,035,065 | 7/1977 | Fletcher | 350/310 |

FOREIGN PATENT DOCUMENTS 739458 6/1980 U.S.S.R. ............................. 350/310

*Primary Examiner*—Robert L. Lindsay, Jr.
*Attorney, Agent, or Firm*—Lewis H. Eslinger

[57] ABSTRACT

The method is characterized by moulding at least one slab of a thermoplastic, normally solid material under heat treatment against a matrix having a form substantially matching that of the final mirror to form a shell (6) introducing into the shell a material selected from the group consisting of; (1) glass bubbles of a thermoplastic, normally solid material; (2) a composition of a powder of a thermoplastic, normally solid material together with an expanding agent, and; (3) mixtures thereof, and bringing the glass bubbles and the powder particles of the composition resp., the latter after expansion, to adhere, on one hand to each other, and on the other to the shell to form a porous supporting structure. The mirror blank according to the invention comprises a shell (6) of a thermoplastic, normally solid material and a supporting structure of the material in said group filling the shell, the glass bubbles and the powder particles resp. being attached to each other and to the shell. If sheet glass is used for the shell and as a powder in the composition, the composition will further include 0-2% by weight of viscosity reducing $Li_2CO_3$ and 4% by weight of $CaCO_3$ as an expansion agent (all counted on the glass powder).

12 Claims, 11 Drawing Figures

METHOD OF MAKING MIRROR BLANKS INCLUDING BLANKS MADE ACCORDING TO SAID METHOD

The present invention is related to a method of making mirror blanks. The mirror blanks according to the invention can be utilized for making mirrors of optical quality, by what is understood that it is a matter of precision mirror, whose trueness to shape is better than ca 0.001 mm. The mirror blanks according to the invention can also be utilized in other reflecting systems, as e.g. solar mirrors for recovering solar energy, mirrors for radar purposes, etc.

Light optical mirrors are desired in many contexts, as mobile instruments, instruments subject to acceleration stresses, e.g. in airplanes and space vehicles, space telescopes, optical scanning systems, solar heating systems, etc. A great problem with such optical mirrors is the weight of the mirrors. A common rule of thumb is that the thickness of the mirror should not be below 10% of the greatest geometric extension of the mirror. A plane mirror having a diameter of 300 mm should thus have a thickness of 30 mm, and the weight of such a mirror is ca 6.4 kg. Such a mirror has great moments of inertia and makes great demands on a control equipment if such is used for adjusting the mirror. It is known to reduce the weight of a mirror by utilizing in making the mirror the so-called surface adhesion method, implying that the polishing is make in the usual manner to the best possible result. Then one of the polished surfaces is pressed against a master surface being very true to shape, which during the continued polishing gives support to the thin mirror material so that the same will not be deformed by the polishing pressure. This method of making mirrors is expensive, and the finished mirror has a low rigidity of shape.

Another known method of reducing the weight of a mirror is shown in the Swedish patent specification No. 70.08559-2, according to which the back of the mirror blank is provided with a plurality of recesses. The surface area of the recesses must not be too large, for the polishing pressure used in polishing the mirror causes a depression of the mirror face and leads by that to a non-planar face. The practical weight reduction is ca. 25% at its maximum. Another known manner of reducing the weight of the mirror is to connect front and back plates to each other by means of a plurality of rods or tubes of glass. The units are fused at ca. 900° C. The enclosed cavities should be vented, since if not the pressure of the enclosed air, which varies with temperature, will influence the planar condition of the mirror face. As above, the area of the cavity must not be too large, for then the face will yield under the polishing pressure, and the underlaying structure can be traced in the polished face. Cf. in this context Swedish patent specification No. 71.00220-8. Another mirror having a low weight is the so-called replica mirror, which consists of a basic material of glass, metal or ceramic. The future mirror face is machined, e.g. by milling or grinding, to a plainess of ca. 0.01 mm. Through a casting process against this very precise master face the mirror face is moulded directly against the basic material. As casting material a polymer epoxy type material is used, and because of this the mirror quality does not normally satisfy the requirements of precision optics. The manufacturing process does not comprise any polishing, and accordingly relatively large recesses of the type shown in the first-mentioned Swedish patent specifications can be made. The weight reduction thanks to the recesses can be rather great, ca. 40%.

In U.S. Pat. No. 4,035,065 a mirror is disclosed including a cellular bed or substrate 4 laminated with a reflecting element. The reflecting element which consists of a glass slab having a silvering, is glued to the substrate. If the mirror is to have a concave form the substrate has a matching concave form, and the plane glass slab, the under-side of which is provided with a layer of glue, e.g. epoxy, is sucked against the substrate by means of vacuum until the desired contour is obtained. The vacuum is retained until the glue has hardened. Mirrors made in this way are lightweight but have intrinsic tensions, making the mirrors fragile. Ideally, a mirror should be dead, i.e. have no tensions at all.

The object of the present invention is to eliminate the disadvantages of the mirrors previously known and to provide a mirror blank that can be polished by conventional methods to any desired optical quality. The characteristic feature of the mirror blank according to the invention is its low weight. The mirror blank according to the invention can be plane, spheric or aspheric. The mirror blank according to the invention can, after silvering but without any polishing done, be used directly in an optical system for e.g. solar mirrors where the requirements on the true shape of the mirror face need not be made too great. In certain applications it can be favourable that the silvering is made on the inner face of the shell mould after building said shell mould.

The feature characterizing the invention will appear by the appended patent claims.

Figure 5:
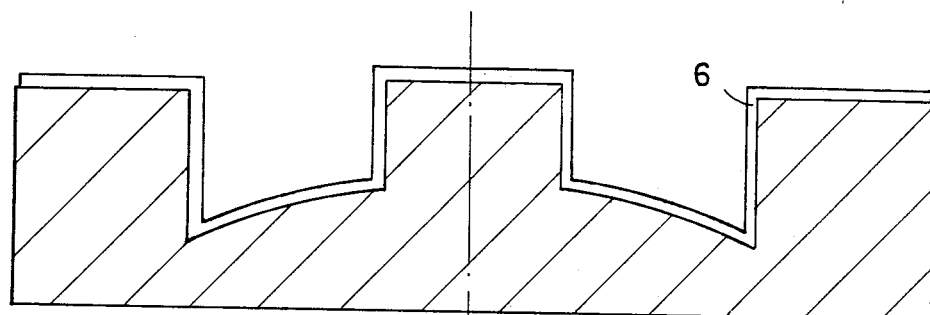
Figure 6:
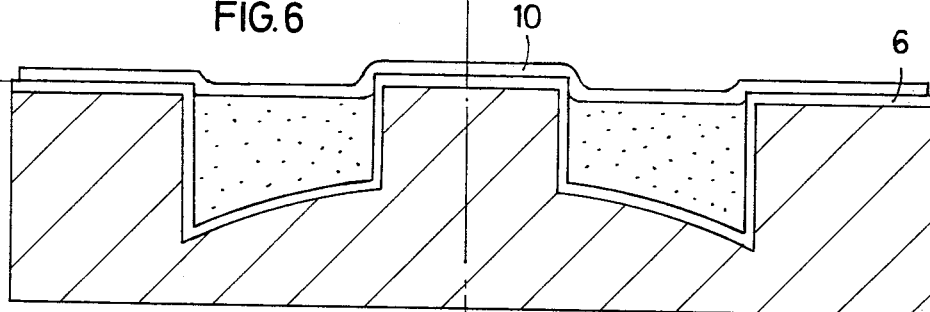
Figure 7:
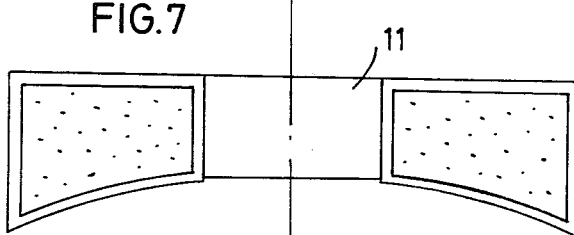
Figure 8:
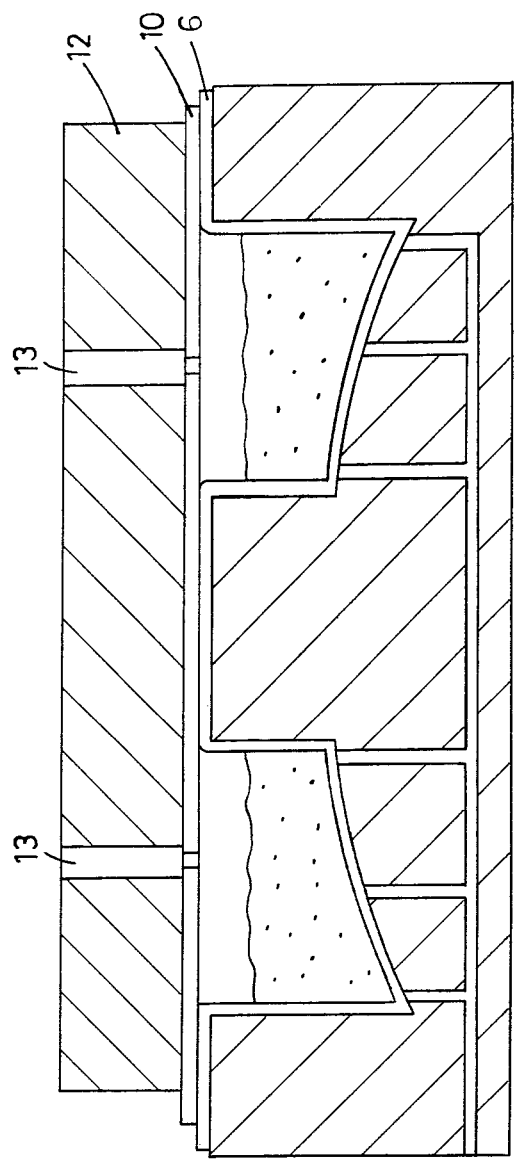
Figure 9:
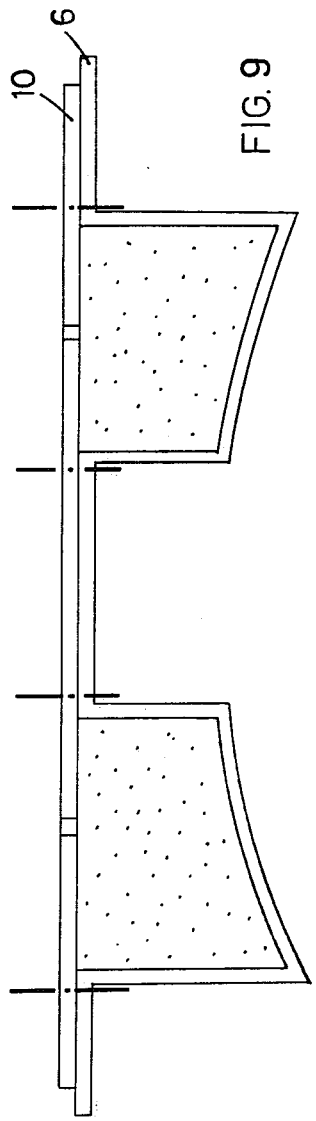
Figure 10:
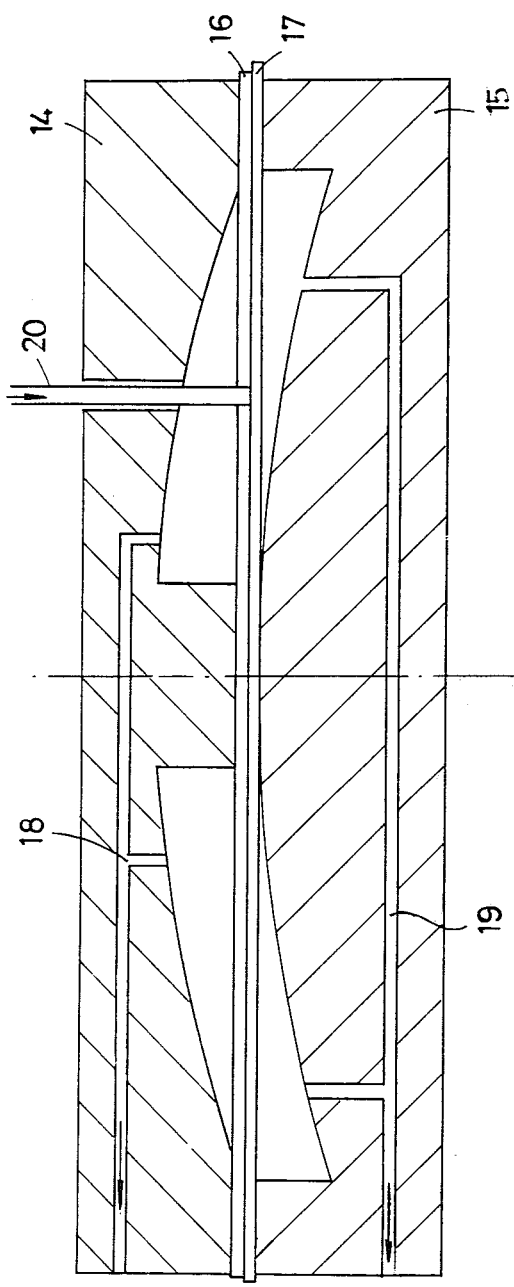
Figure 11:
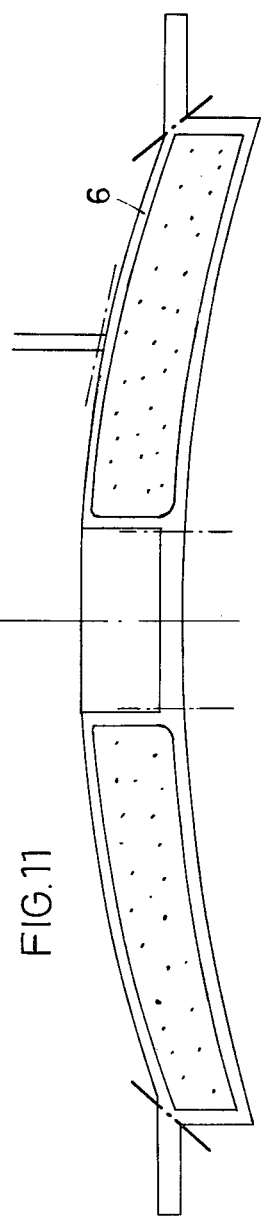

The invention will be described in detail below and with reference to various embodiments shown in the drawings, wherein FIGS. 1, 2, 3 and 4 are cross sectional views of a master matrix and of a glass slab at three different steps of the manufacturing process according to the invention;

FIGS. 5, 6 and 7 are corresponding views of another master matrix at different steps of an alternative embodiment of the manufacturing method according to the invention;

FIGS. 8 and 9 are cross sectional views of a master matrix, a glass slab and a moulding at two different steps of the manufacturing process according to the invention, and FIGS. 10 and 11 are cross sectional views of a master matrix consisting of two mould halves and two glass slabs placed therebetween at two different steps in another embodiment of a manufacturing process according to the invention.

Figure 2:
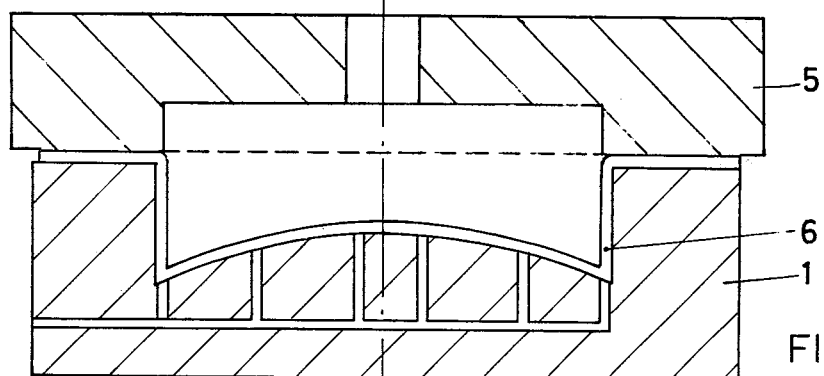

FIG. 1 is a cross sectional view of a master matrix 1 the inner form of which corresponds substantially to that of the finished mirror. In the master matrix a plurality of channels 2 are provided which are in communication with a vacuum source not shown. A glass slab 3 that can e.g. be plane as shown in FIG. 1 but which may of course have other configurations, is placed on top of a collar 4 of the master matrix 1. A plate 5 of graphite is placed over the glass slab 3 to hold the rim of glass slab 3 close to collar 4. The assembly in FIG. 1 is placed in a furnace and is heated to the softening temperature of the glass slab or its equivalent simultaneously with the application of vacuum. Glass slab 3 is then sucked down into the matrix and will cling close to the inner form thereof. Graphite plate 5 is provided with a central vent 5A permitting the glass slab to detach from plate 5 when vacuum is applied. A shell 6 having the form shown in FIG. 2 is obtained. The process described so far is called building a shell mould.

Shell 6 is then filled either with glass bubbles or with a composition of glass powder and expanding agent or with a mixture thereof. When glass bubbles alone are used the shell is filled to the level shown in FIG. 2 with a dashed line. Glass bubbles are small balloons of glass which are marketed assorted with respect to size and with respect to glass quality. Table 1 is illustrating the physical properties of the glass bubbles. The consistency of the glass bubbles is much the same as that of quicksand. The coefficient of expansion of glass slab 3 is selected to be as near as possible to that of the glass bubbles. The shell 6 filled with glass bubbles is subsequently heated to the sintering temperature of the glass bubbles causing the latter to stick to each other and to shell 6. Then the temperature is lowered in a controlled manner, and an integral coherent unit is obtained, which is subsequently removed from the master matrix 1 and trimmed, as for example along the dash dotted line in FIG. 3. A mirror blank is then obtained the face 7 (FIG. 3) of which can be subsequently polished in a manner known per se and provided with a reflecting layer by means of vapour deposition technique known per se. By the fact that the surface 7 is everywhere supported by the cellular, of sintered glass bubbles consisting body, which forms a unit integral with the shell 6, no deflections in the glass will arise at polishing pressures conventionally used. By the fact that the density of the glass bubbles is ca. 1/10 of that of normal solid mirror glass, a corresponding weight reduction in the mirror will be obtained while retaining good rigidity of shape. The structure obtained after the controlled cooling is substantially free from tensions. The mirror blank obtained can also be used as a basis for the replica mirrors mentioned by way of introduction. It is further to note that additional, time consuming shaping, i.e. cutting the outer contours of the mirror, will be superfluous. Rough turning by curve generators, something being the usual manner of making the concave face of a concave mirror, need not be relied upon when making mirror blanks by the method of building a shell mould according to the present invention. The weight reduction of the mirror blank according to the invention counted on the basis of a corresponding mirror of solid glass is greater than ca. 70%. Glass bubbles are a low-priced material, and a mirror blank made according to the method will accordingly be cheaper than a conventional solid mirror blank.

Instead of filling the shell 6 with glass bubbles it can be partially filled with a composition of glass powder and expanding agent. When sheet glass is used the composition includes besides glass powder 0-2% by weight (counted on the glass powder) of viscosity reducing $Li_2CO_3$ and 4% by weight (counted on the glass powder) of $CaCO_3$ as an expanding agent. $Li_2CO_3$ will to some extent also act as an expanding agent. The composition is made by mixing intimately glass powder and the remaining ingredients in a ball mill until the mesh size for the composition is ca. 300-500 mesh. It is understood that the glass of the glass powder can be something else than sheet glass, e.g. quartz glass, Pyrex glass, so-called Brillerglass, BK7 glass or lead glass. The glass can be of the same kind as the glass of the shell 6 or either it can be of a glass having a lower softening temperature than the glass of the shell 6 and having a coefficient of expansion adapted to the coefficient of expansion for the glass of the shell. The ground composition has when sheet glass is used, a specific gravity of ca. 1-1.2 kg/dm$^3$. The shell 6, that may but need not be removed from the master matrix, is filled by ca. one half with the composition and heated in a furnace up to a temperature at which the composition begins to expand (FIG. 3) and will fill up the shell completely (possibly the foamed or expanded glass will puff up over the shell mould). After that the shell and the expanded structure is subjected to a controlled temperature reduction down to room temperature. The structure formed of the composition has a specific gravity that, i.a. depending on the temperature-time graph of the heat treatment, is more than half of the original specific gravity of the composition. By varying the extent to which the shell is filled with the composition, it will thus be possible to vary the specific gravity of the glass structure. Other kinds of glass having other softening temperatures than sheet glass may require other expanding agents, and possibly may also the viscosity reducing agent be excluded.

Figure 3:
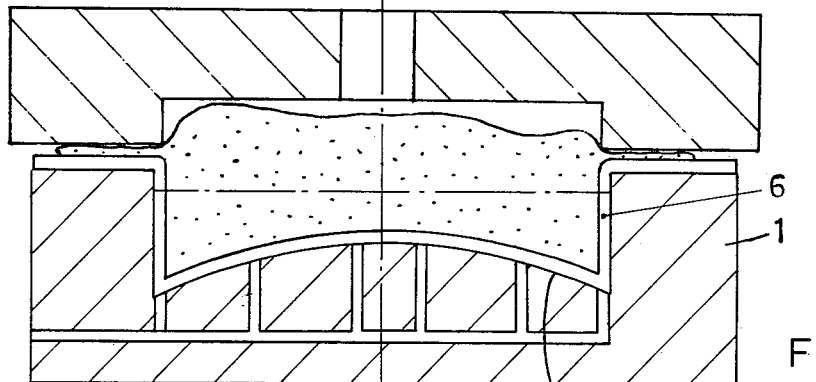
Figure 4:
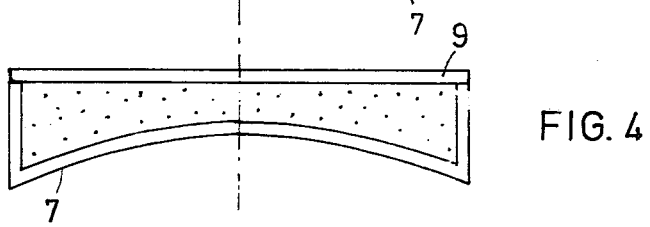

According to one embodiment of the invention the glass of the composition is of the same kind as the glass of the shell. The shell, by ca. one half filled with the composition, is heated in a furnace up to ca. 700° C., the shell then beginning to soften and the volume of the composition will contract (shrink) considerably. The temperature in the furnace is further increased, and $CaCO_3$ will disintegrate while emitting $CO_2$ causing the composition to rise and fill up the shell (FIG. 3). A certain expanding pressure will exist, something that straightens the softened shell. It is feasable to hold or fix the softened shell by placing it in the matrix 1 and holding it by means of vacuum, so-called vacuum fixation. The expanded structure must not remain for too long in heat, for then the gas pores in the glass structure formed at the expansion can become too large, something deteriorating the strength of the glass structure. The expanded structure must accordingly as soon as possible be exposed to the controlled cooling to room temperature.

According to another embodiment of the invention the glass of the composition is of a glass, e.g. lead glass, having a lower softening temperature than the softening temperature of the shell, and having a coefficient of expansion that is adapted to the coefficient of expansion of the shell within a temperature range extending from the setting temperature of the glass down to the lowest working temperature of the finished mirror. The detached shell, i.e. the shell removed from the master matrix, is filled by ca. one half with the composition, is heated up to the softening temperature of the glass of the composition, the expansion then beginning. Lead glass has a good affinity and the expanded structure will adhere positively to the glass of the shell. A controlled cooling is provided on terminating the expansion.

Building the shell mould and expanding the composition can according to a further embodiment of the invention be made simultaneously. The glass of the composition will then be of the same kind as the glass of the shell. The same layout as that shown in FIG. 1 is then used, with the addition that a cavity 8 situated in the underside of the plate 5, the volume of said cavity corresponding to ca. half the volume of the shell 6, is filled with the composition. The whole assembly is then heated in a furnace up to the softening temperature of the slab 3, vacuum is applied (FIG. 2) and the building of the shell mould is carried out at the same time as the composition shrinks. When the temperature in the furnace subsequently increases, expansion will begin (FIG. 3). On terminating the expansion, the controlled cooling is applied and the cooled product is removed from the matrix and trimmed. The advantage of this process is that one heating alone is required. Normally one heating for building the shell mould and another for the expansion is otherwise required.

For mirrors where the requirement on the optical quality is not too great, the glass bubbles can be made to adhere to each other and to the shell mould by means of an adhesive, e.g. an UV-setting adhesive. The heat treating step for sintering the glass bubbles will then be omitted. If the requirement on the optical quality is not too great, the expansion of the composition can be made by chemical means by foaming the glass powder in its cold state, the heat treating step for expanding the composition likewise being omitted.

The trimmed mirror blank made by one of the methods described in connection with FIGS. 1–3 can be provided with a back 9 (FIG. 4) of glass of the same kind as that used for the shell 6. In making this back one starts from a glass slab, which is coated with a thin layer of so-called sealing glass, e.g. lead glass, the sintering temperature of which is to be lower than that of the shell and also lower than that of the structure filling the shell 6. Following this the shell including the back 9 is heated up to the sintering temperature of said sealing glass until the back adheres to the trimmed rim of the shell 6 and to the porous structure filling the shell. The whole assembly is then subjected to a controlled and slow cooling.

Expanding the composition and attaching the back 9 can in accordance with the invention be made simultaneously. The finished shell 6 is filled to a desired degree with the composition and covered with a glass slab corresponding to the back 9. A vent not shown is made in the peripheral side rim of the shell, and the whole assembly is put edgewise into the furnace with the vent directed upwardly. The gas formed during the expansion will then travel a rather long distance through the risen glass composition, something that will promote the expansion. On terminating the expansion the mirror blank is subjected to a controlled cooling.

FIGS. 5–7 the process of making a blank for a concave mirror having a central bore is shown. A shell 6 was formed from a glass slab by putting it along with the master matrix into a furnace and by heating it to a temperature above the softening-point of the glass slab. In this process the shell 6 shown in FIG. 5 is formed, which is subsequently filled with glass bubbles or with said composition of glass powder and expanding agent. On top of the shell 6 an additional glass slab 10 is then placed. The whole assembly is then heated, e.g. in a furnace, to the softening temperature of the glass bubbles or to the temperature at which the expansion begins, resp. The additional glass slab 10 will then soften and adopt the form shown in FIG. 6. The softened glass bubbles and the expanded glass powder resp. sinter to each other and to the shell 6 and besides to the moulded additional glass slab 10. All the assembly is then subjected to a controlled cooling. The finished intermediate product is trimmed along the dash dotted line indicated in FIG. 6, and a mirror blank of the kind shown in FIG. 7 is obtained. The mirror blank is quite self-supporting, and the attachment of the mirror can e.g. be made at the central bore 11. It is in this way possible to make very large, self-supporting mirrors having diameters as far as up to 2–4 m, which on completion of a possible polishing and silvering, e.g. can be used as solar collectors.

The internal pressure of the glass bubbles can influence the manufacturing process according to the invention. If the glass bubbles have a partial vacuum, it is conceivable that they might shrink during the heating step according to FIG. 6, thus decreasing in their volume during the heat treatment provided. To compensate for such a decrease in volume that may arise, one expedient is either to lower the pressure in the furnace in which the heat treating is carried out and/or refill with fresh glass bubbles so that the glass bubbles are filling the space between the shell and the additional glass slab 10 and/or add expansion agent completely.

In FIGS. 8 and 9 another embodiment of the method according to the invention is shown. Glass bubbles do not completely fill the space formed between the shell 6 and the additional glass slab 10. A moulding 12 is deposited on the additional glass slab 10. The assembly is put into a furnace and heated up to the softening temperature of the glass. The atmospheric pressure in the furnace is lowered and the glass bubbles will expand and fill up said space between the shell 6 and the additional glass slab 10 completely. Vacuum is applied through aperture 13 in the moulding 10 and through apertures provided beforehand in the additional glass slab 10, the latter apertures being aligned with said apertures 13 as shown in FIG. 8. Instead of lowering the pressure in the furnace further glass bubbles can be supplied by being pumped in, i.e. fed in under pressure, through the apertures 13 and corresponding apertures in the additional glass slab 10.

The layout shown in FIGS. 8 and 9 can also be used in connection with the composition of glass powder and expanding agent. The expanding process is hastened by applying vacuum in the apertures 13. It is feasible first to blow oxygen across the composition, something that contributes to shortening the expanding time.

The mirror blank formed, shown in FIG. 9, is trimmed along the dash dotted lines.

In FIGS. 10 and 11 another embodiment of the method according to the present invention is shown. In this case the matrix consists of two matrix halves 14, 15, between which two glass slabs 16 and 17 are provided. Building the shell mould will be done by putting the matrix and the glass slabs into a furnace for heating. In order that the form of the glass slabs shall adapt to the form of the respective matrix half 14, 15, vacuum and/or compressed air is applied. Vacuum, in case such is used, is applied through conduit systems 18, 19 provided in each respective matrix half, while compressed air, if such is used, is applied through conduit 20, which opens into the interface between the two superposed glass slabs 16 and 17. After formation of the shell mould, glass bubbles or said composition of glass powder and expanding agent is supplied through the conduit 20. The additions are then treated in the manner previously described. The finished mirror blank is then trimmed along the dash dotted lines shown in FIG. 11. The method illustrated in FIGS. 10 and 11 is particularly suitable in connection with mass production of large mirrors, e.g. solar collectors, since the whole process can be done at one single step without intermediate cooling.

The embodiments shown were described in connection with glass slabs, glass bubbles besides a composition containing glass powder. Instead of using glass bubbles alone or the composition alone, a mixture of glass bubbles and the composition can be used for filling the shell mould. Other materials than glass are possible, as e.g. plastic or ceramic. The individual field of use will determine which the most suitable material will be. In any case material used should be a normally solid material susceptible to forming by heat treatment.

It may be advantageous that a fraction of the glass bubbles are not permitted to adhere to each other. These "free" glass bubbles will serve as a vibration damping mass.

It has been described above that the basic material when building the shell mould is a slab of a normally solid, thermoplastic material, but it is understood to be within the scope of the invention to use glass blowing technique to make the shell.

The embodiments of the invention described above can be modified and varied in many ways within the scope of the basic principle of the invention.

I claim:

1. A method of making mirror blanks, characterized by moulding at least one slab, (3; 16, 17) of a thermoplastic, normally solid material under heat treatment against a matrix (1; 14, 15) having a form substantially matching that of the final mirror, to form a shell, introducing into the shell a material selected from the group consisting of
    (1) glass bubbles of a thermoplastic, normally solid material, and
    (2) a composition of a powder of glass together with an expansion agent, and
    (3) mixtures thereof,
and bringing the glass bubbles and the powder particles of the composition resp., the latter after expansion, to adhere, on one hand to each other, and on the other to the shell (6) to form a porous supporting structure.

2. A method according to claim 1, characterized by applying vacuum in the space formed between the slab (3; 16, 17) and the matrix (1; 14, 15) during formation of the shell.

3. A method according to claim 1 or 2, said matrix comprising two mould halves (14, 15) between which two slabs of said thermoplastic, normally solid material are provided, characterized by heat treating both slabs (16, 17) to form the shell (6), applying said vacuum in the space formed between the respective slab and its associated mould half, and/or introducing compressed air between the slabs, the shell being then formed, and introducing the glass bubbles, the composition and the mixture thereof resp. into the space of the shell mould formed between the slabs.

4. A method according to claim 1, said material being glass, characterized by heat treating the glass bubbles and composition resp. to sinter the glass bubbles and glass particles resp. to each other and to the shell (6) to effect said adhesion, and subjecting the assembly formed of shell and support structure to a controlled cooling.

5. A method according to claim 1, characterized by attaching a back (9) to the shell (6) and the porous supporting structure filling the shell.

6. A method according to claim 1, characterized by placing an additional slab (10) of a thermoplastic, normally solid material onto the face of the shell remote from the matrix, and introducing the glass bubbles, the composition and the mixture thereof resp. into the shell (6).

7. A method according to claim 1, characterized by gluing the glass bubbles and the shell, e.g. with an UV-setting glue, to effect said adhesion.

8. A method according to claim 5, characterized by expanding the composition through heat treatment.

9. A method according to claim 5, characterized by expanding the composition through foaming the glass powder in a cold state.

10. A method according to claim 4, characterized by heat treating the composition simultaneously with building the shell mould.

11. A mirror blank made by the method according to claim 1, characterized by a shell (6) of a thermosplastic,

|  |  | Industrial grade |  |  | Electrical grade |  | Hydrospace grade |  |  |  |  |
|---|---|---|---|---|---|---|---|---|---|---|---|
|  |  |  |  |  | S1 | VT | FT 102 | FTD 202 | FTL 200 |  |  |
|  |  | G 101 Stand. indust. grade | 1GD 101 Higher strength | 1G 25 Lower density | R Stand. electr. grade | High temp. Low loss | Surf. treat. f. org. systems | Buoyancy at moder. depths | Buoyancy at 6000 m depths | Lower density shallow depths | FTF 15 Small diam. part.s | Ceramic FA-A Filler |
| Composition |  | ← ← sodium borosilicate glass → → |  |  |  | ← silica → |  | ← ← ← ← insoluble glass → → → → |  |  |  | ceramic |
| Bulk density |  | 0.194 | 0.194 | 0.145 | 0.166 | 0.152 | 0.164 | 0.153 | 0.155 | 0.130 | 0.198 | 0.4 |
| True particle density g/cc |  | 0.311 | 0.300 | 0.237 | 0.361 | 0.254 | 0.272 | 0.250 | 0.238 | 0.209 | 0.325 | 0.6 |
| Particle | >175 | 5 | 0 | 0 | 8 | 0 | 0 | 3 | 4 | 2 | 0 | 5 |
| size | 149–175 | 10 | 0 | 6 | 7 | 14 | 14 | 14 | 3 | 8 | 0 | 11 |
| range | 125–149 | 12 | 2 | 6 | 11 | 19 | 15 | 14 | 6 | 12 | 0 | 19 |
| μm | 100–125 | 12 | 2 | 13 | 10 | 12 | 16 | 13 | 51 | 13 | 0 | 24 |
| % by weight | 62–100 | 44 | 46 | 42 | 40 | 40 | 43 | 44 | 23 | 52 | 0 | 35 |
|  | 44–62 | 10 | 19 | 12 | 10 | 15 | 7 | 7 | 12 | 11 | 0 | 4 |
|  | <44 | 7 | 31 | 21 | 14 | 9 | 5 | 5 | 12 | 2 | 100 | 2 |
| Packing factor |  | 0.624 | 0.647 | 0.614 | 0.46 | 0.559 | 0.603 | 0.611 | 0.651 | 0.621 | 0.610 | 0.620 |
| Average wall thickness |  | 2 | 1.5 | 1.5 | 2 | 1.5 | 1.7 | 1.5 | 1.2 | 1.5 | 0.4 | 3.5 |
| Softening temperature (°C.) |  | 482 | 482 | 482 | 482 | 1000 | 316 | 1093 | 1093 | 1093 |  | 982 |
| Thermal conductivity (Kcal) (cm) (hr) (m$^2$) (°C.) |  | 9.30 | 9.30 | 8.68 | 9.92 | 8.68 | 9.30 | 8.68 | 8.68 | 8.19 | 9.30 | 11.13 |
| Strength under hydrostatic pressure, volume % survivors at 110 kg/cm$^2$ |  | 47.0 | 76.6 | 44.0 | — | 55.0 | — | 66.8 | 79.4 | 46.2 | 90.0 | 83.0 |
| Cost, relative |  | Low | Low | Low | Medium | High | High | Medium | Medium | Medium | High | Low | normally solid material and a porous supporting structure filling said shell and of a material selected from the group consisting of
  (1) glass bubbles of a thermoplastic, normally solid material, and
  (2) a composition of a powder of a thermoplastic, normally solid material together with an expanding agent, and
  (3) a mixture thereof,
and by the fact that the glass bubbles and the powder particles resp. are attached to each other and to the shell.

12. A mirror blank according to claim 11, characterized by the fact that the shell (6), the glass bubbles and the powder material are of glass.

* * * * *